United States Patent
Sato

(10) Patent No.: US 8,848,103 B2
(45) Date of Patent: Sep. 30, 2014

(54) CONTENT DATA DISPLAY DEVICE, CONTENT DATA DISPLAY METHOD AND PROGRAM

(75) Inventor: Takuya Sato, Tokyo (JP)

(73) Assignee: NEC Biglobe, Ltd., Tokyo (JP)

( * ) Notice: Subject to any disclaimer, the term of this patent is extended or adjusted under 35 U.S.C. 154(b) by 0 days.

(21) Appl. No.: 13/547,773

(22) Filed: Jul. 12, 2012

(65) Prior Publication Data

US 2013/0016281 A1    Jan. 17, 2013

(30) Foreign Application Priority Data

Jul. 13, 2011    (JP) .................................. 2011-155220

(51) Int. Cl.

| | | |
|---|---|---|
| *H04N 7/00* | (2011.01) | |
| *H04N 5/445* | (2011.01) | |
| *H04N 5/76* | (2006.01) | |
| *H04N 5/92* | (2006.01) | |
| *G06T 13/00* | (2011.01) | |
| *H04N 1/00* | (2006.01) | |
| *H04N 21/488* | (2011.01) | |
| *H04N 1/32* | (2006.01) | |
| *H04N 21/84* | (2011.01) | |
| *H04N 21/431* | (2011.01) | |
| *H04N 21/485* | (2011.01) | |

(52) U.S. Cl.
CPC ....... *H04N 1/32112* (2013.01); *H04N 1/00453* (2013.01); *H04N 1/00448* (2013.01); *H04N 2201/3273* (2013.01); *H04N 2201/0096* (2013.01); *H04N 2201/3264* (2013.01); *H04N 21/4856* (2013.01); *H04N 2201/3266* (2013.01); *H04N 2201/3249* (2013.01); *H04N 5/445* (2013.01); *H04N 21/4884* (2013.01); *H04N 2201/3277* (2013.01); *H04N 21/84* (2013.01); *H04N 1/0045* (2013.01); *H04N 1/00461* (2013.01); *H04N 21/4858* (2013.01); *H04N 21/4316* (2013.01); *H04N 2005/44526* (2013.01)

USPC ...... 348/468; 348/564; 348/231.99; 386/244; 345/473

(58) Field of Classification Search
None
See application file for complete search history.

(56) References Cited

U.S. PATENT DOCUMENTS

| | | | |
|---|---|---|---|
| 6,069,622 A | | 5/2000 | Kurlander |
| 6,088,064 A | * | 7/2000 | Rumreich et al. ............ 348/564 |

(Continued)

FOREIGN PATENT DOCUMENTS

| | | |
|---|---|---|
| JP | 11-110480 A | 4/1999 |
| JP | 2002-251279 A | 9/2002 |

(Continued)

OTHER PUBLICATIONS

Communication dated Nov. 7, 2012 from the European Patent Office in counterpart European application No. 12176096.1.

(Continued)

*Primary Examiner* — Jefferey Harold
*Assistant Examiner* — Sean Haiem
(74) *Attorney, Agent, or Firm* — Sughrue Mion, PLLC

(57) ABSTRACT

It is desired to provide a content data display device having a caption display function which can effectively use the screen of the limited size and achieves a high operability. A content data display device includes: a storage unit configured to store an image data and a content data which includes at least one caption data which respectively corresponds to at least one region on the image data; a display unit configured to display the image data; an input unit configured to select a selected region from the at least one region; and a control unit configured to display a caption data which is one of the at least one caption data and corresponds to the selected region to overlap on the selected region of the image data as a selected caption data.

17 Claims, 9 Drawing Sheets

(56) References Cited

U.S. PATENT DOCUMENTS

| | | | |
|---|---|---|---|
| 2002/0065088 A1* | 5/2002 | Seignol et al. | 455/466 |
| 2002/0122039 A1* | 9/2002 | Minagawa et al. | 345/473 |
| 2005/0039138 A1 | 2/2005 | Urbina | |
| 2006/0092291 A1* | 5/2006 | Bodie | 348/231.99 |
| 2008/0292272 A1* | 11/2008 | Yamazaki et al. | 386/95 |
| 2009/0135438 A1* | 5/2009 | Chopra et al. | 358/1.6 |

FOREIGN PATENT DOCUMENTS

| | | |
|---|---|---|
| JP | 2002-259111 A | 9/2002 |
| JP | 2003-179888 A | 6/2003 |
| JP | 2003203242 A | 7/2003 |
| JP | 2006-172118 A | 6/2006 |
| JP | 2007-35056 A | 2/2007 |
| JP | 2007-325282 A | 12/2007 |
| JP | 2008-217696 A | 9/2008 |
| JP | 2009-98727 A | 5/2009 |
| JP | 2010-102666 A | 5/2010 |

OTHER PUBLICATIONS

Japanese Office Action dated Apr. 15, 2013 issued by the Japanese Patent Office in corresponding Japanese Patent Application No. 2011-155220.

* cited by examiner

Fig. 2

20: TITLE TABLE

| TITLE IDENTIFIER | TITLE NAME |
|---|---|
| A001 | AAA |
| A002 | BBB |
| A003 | CCC |

Fig. 3

30: IMAGE DATA TABLE

| PAGE IDENTIFIER | IMAGE DATA NAME |
|---|---|
| P001 | G001.jpg |
| P002 | G002.jpg |
| P003 | G003.jpg |

Fig. 4

40: CAPTION DATA TABLE

| CAPTION IDENTIFIER | LANGUAGE IDENTIFIER | CAPTION DATA NAME | PAGE IDENTIFIER | SPEECH REGION | DISPLAY POSITION INFORMATION |
|---|---|---|---|---|---|
| J001 | en | J001.txt | P001 | X:300 Y:100 W:100 H:100 | UPPER PART:0 |
| J002 | en | J002.txt | P001 | X:100 Y:100 W:100 H:100 | UPPER PART:0 |
| J003 | en | J003.txt | P002 | X:500 Y:800 W:800 H:100 | LOWER PART:1 |

50: FRAME DATA TABLE

| FRAME IDENTIFIER | PAGE IDENTIFIER | FRAME REGION | CAPTION IDENTIFIER |
|---|---|---|---|
| K001 | P001 | X:100 Y:100 W:600 H:700 | J001, J002 |
| K002 | P002 | X:350 Y:800 W:250 H:500 | J003 |
| K003 | P003 | X:100 Y:800 W:250 H:500 | J004 |

CONTENT DATA DISPLAY DEVICE, CONTENT DATA DISPLAY METHOD AND PROGRAM

INCORPORATION BY REFERENCE

This patent application claims priority on convention based on Japanese Patent Application No. 2011-155220. The disclosure thereof is incorporated herein by reference.

TECHNICAL FIELD

The present invention relates to a content data display device. Specifically, the present invention relates to a content data display device which displays a caption data on an image data.

BACKGROUND ART

Software for displaying content data represented by electronic comics on a smartphone, a tablet terminal and the like has become widespread. There is a case that a user of a smartphone, a tablet terminal and the like refers content data which includes language information other than one's native language. There is also a case that the letter information (character string) included in an image data is difficult to be read caused by the small display screen area of the mobile terminal like the smartphone or tablet terminal. Assuming such a using condition, the technique for displaying a caption data with an image data on the screen is known.

For providing an electronic comic to a user in the case where the language used in the electronic comic is not the native language of the user, the language described on the electronic comic is required to be translated to the other language for displaying. As a method for realizing this, there is a method of directly processing the image data of the electronic comic delivered to the mobile terminal such as the smartphone or tablet terminal. In this method, for newly generating the image data of the electronic comic for the other language, the letter image of the translation destination language is generated, and the image is pasted on the original language (language before translation) in the speech balloon region of the electronic comic.

For using this method, since a new image data is generated by arranging a translated language data on the original image data using image editor software and the like so that the lettering cost is needed. Namely, the costs for various processing such as an adjustment of sentences for placing them in the speech balloon of the electronic comic, and the review of the font or the character size are needed. Further, in the newly generated image data of the electronic comic, the letter information of the translation destination language is generated as an image data, so that the generated file becomes a comparative size with the image data of the original electronic comic. Therefore, it is difficult to suppress the delivery cost and the storage cost for the user who desires to receive the same electronic comic by a plurality of languages.

Japanese Patent Application Publication JP2002-251279A (Patent Literature 1) is an example of the prior art documents in the field of the present invention.

In Japanese Patent Application Publication JP2002-251279A (Patent Literature 1), an invention of a delivery system which delivers a content including an image and letters is disclosed. The content of this invention is managed by: an image data; a letter data linked to the image data; and the linking data of the image data and the letter data. The display terminal of this invention displays, with the display of the image data on an image display region, the letter data linked by the control data on the letter display region separated from the image display region on a same screen.

In the smartphone, the tablet terminal and the like, a caption display technique which can use the screen of the limited size as effective as possible in displaying a caption corresponding to an image data, and achieves a high operability is required.

CITATION LIST

Patent Literature

[PTL 1] Patent literature 1: Japanese Patent Application Publication JP2002-251279A

SUMMARY OF INVENTION

It is desired to provide a content data display device having a caption display function which can effectively use the screen of the limited size and achieves a high operability.

According to an aspect of the present invention, a content data display device includes: a storage unit configured to store an image data and a content data which includes at least one caption data which respectively corresponds to at least one region on the image data; a display unit configured to display the image data; an input unit configured to select a selected region from the at least one region; and a control unit configured to display a caption data which is one of the at least one caption data and corresponds to the selected region to overlap on the selected region of the image data as a selected caption data.

According to another aspect of the present invention, a content data display method includes: storing an image data and a content data which includes at least one caption data which respectively corresponds to at least one region on the image data on a storage unit; displaying the image data by a display unit; selecting a selected region from the at least one region by an input unit; and displaying a caption data which is one of the at least one caption data and corresponds to the selected region to overlap on the selected region of the image data as a selected caption data by a control unit.

According to the present invention, it is possible to provide a content data display device having a caption display function which can effectively use the screen of the limited size and achieves a high operability.

BRIEF DESCRIPTION OF DRAWINGS

The above and other objects, advantages and features of the present invention will be more apparent from the following description of certain exemplary embodiments taken in conjunction with the accompanying drawings, in which:

FIG. 2 is an example of a title table 20 of the content data display device 15 according to an exemplary embodiment of the present invention;

FIG. 3 is an example of an image data table 30 of the content data display device 15 according to an exemplary embodiment of the present invention;

FIG. 4 is an example of a caption data table 40 of the content data display device 15 according to an exemplary embodiment of the present invention;

FIG. 5 is an example of a frame data table 50 of the content data display device 15 according to an exemplary embodiment of the present invention;

DESCRIPTION OF EXEMPLARY EMBODIMENTS

A content data display device 15 according to some exemplary embodiments of the present invention is explained below with reference to the accompanying drawings.

Explanation of Configuration

Figure 1:
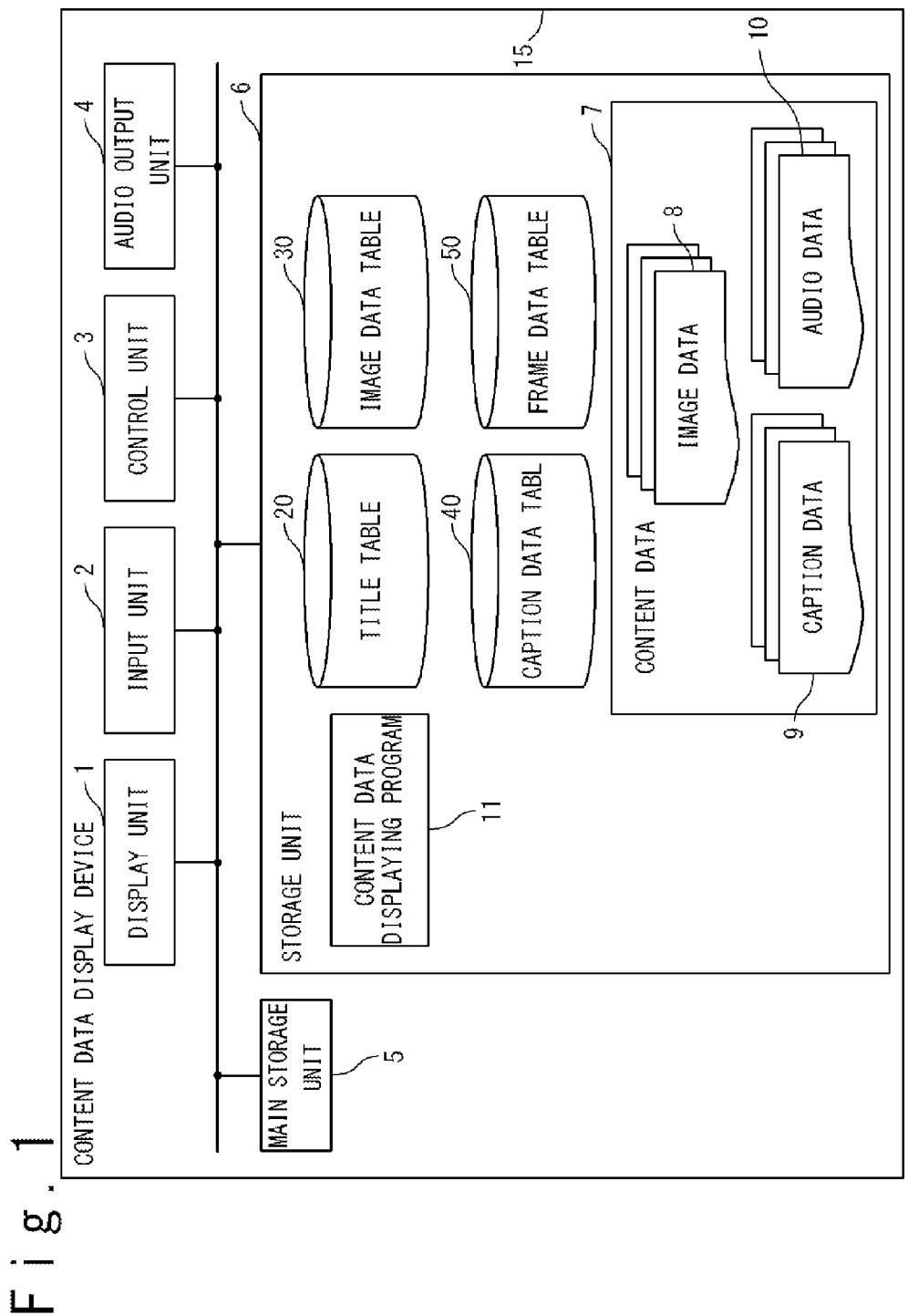
FIG. 1 is a block diagram of a content data display device according to an exemplary embodiment of the present invention.

At first, the configuration of the content data display device 15 according to the present exemplary embodiment is explained. FIG. 1 is a block diagram of the content data display device 15. The content data display device 15 includes: a display unit 1; an input unit 2; a control unit 3; an audio output unit 4; a main storage unit 5; and a storage unit 6.

The display unit 1 displays a content data 7. The input unit 2 is an interface by which a user performs an operation for referring (watching or hearing) the content data 7. The input unit 2 is a button, a pointing device or the like installed in the content data display device 15. As the input unit 2, a touch panel device installed in the display unit 1 may be adopted. The control unit 3 performs a program to control the content data display device 15. The audio output unit 4 installed in (or connected to) the content data display device 15 outputs a sound. The main storage unit 5 is a non-transitory tangible computer-readable recording medium, and the program stored in the main storage unit 5 is read out and performed by the control unit 3.

The storage unit 6 is also a non-transitory tangible computer-readable recording medium, and in the storage unit 6, a content data 7, a table for managing the content data 7, and a content data display program 11 are stored therein. The table for managing the content data 7 includes: a title table 20; an image data table 30; a caption data table 40; and a frame data table 50. The image data table 30, the caption data table 40, or the frame data table may be included in the content data 7.

The content data 7 includes an image data 8 and a caption data 9. The content data 7 may further includes an audio data 10. In the case where the audio data 10 is included in the content data 7, it is possible to output a sound linked to a region on the image data 8 in response to a user's operation. As a method for obtaining the content data 7 stored in the storage unit 6, a method of downloading from a content delivery server to the content data display device 15 via the Internet, and a method of reading from an external storage media can be considered.

The content data display program 11 is a program for controlling the content data display device 15. The control unit 3 read out the content data display program 11 into the main storage unit to perform it.

Next, an example of a data management method of the content data 7 according to this exemplary embodiment will be described.

FIG. 2 is an example of the title table 20 of the content data display device 15 according to this exemplary embodiment of the present invention. In the title table 20, the title identifier 21 and the title name 22 are linked to each other and stored. The title identifier 21 is an identifier allocated to each title of the content data 7. The title name 22 is a title name of the content data 7. The content data 7 of this exemplary embodiment is managed by the image data table 30, the caption data table 40, and the frame data table 50 which are linked to each other for each title identifier.

FIG. 3 is an example of the image data table 30 of the content data display device 15 according to this exemplary embodiment of the present invention. In the image data table 30, the page identifier 31 and the image data name 32 are linked to each other and stored. The page identifier 31 is an identifier allocated to each page of the content data 7. The image data name 32 is a file name of the image data 8. Though the image data name 32 shows the jpg file format in FIG. 3, it may be other formats like gif format.

FIG. 4 is an example of the caption data table 40 of the content data display device 15 according to this exemplary embodiment of the present invention. In the caption data table 40, the caption identifier 41, the language identifier 42, the caption data name 43, the page identifier 44, the speech region 45, and the display position information 46 are linked to each other and stored. The caption identifier 41 is an identifier allocated to each caption. The language identifier 42 is an identifier for identifying the language (English, French, Chinese, and the like) of the caption data. The caption data name 43 is a file name of the caption data. Though the caption data name 43 is a txt format in FIG. 4, it may be other file formats like xml format. The page identifier 44 is an identifier of the page on which a speech corresponding to each caption data exists. The page identifier 44 corresponds to the page identifier 31 of the image data table 30.

Figure 6:
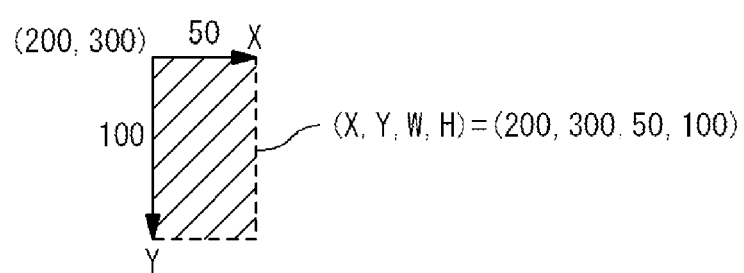
FIG. 6 is a chart for explaining a method for specifying a region on the image data 8 in the content data display device 15 according to an exemplary embodiment of the present invention.

The speech region 45 indicates the region occupied by the speech corresponding to the caption data 9. FIG. 6 is a diagram for explaining the method of specifying the region on the image data 8 in the content data display device 15 according to this exemplary embodiment of the present invention. In the example of FIG. 6, the rectangular region from the coordinate point (X,Y)=(200,300) and the Height: 100 and the Width: 50 is defined by (X,Y,W,H)=(200,300,50,100). The display position information 46 indicates the display position of the caption data 9 displayed on the display unit 1 based on the speech region 45.

FIG. 5 is an example of the frame data table 50 of the content data display device 15 according to this exemplary embodiment of the present invention. The frame data table 50 is a table for managing the relation of frames and captions in a case where the content data 7 is an electronic comic. In the frame data table 50, the frame identifier 51, the page identifier 52, the frame region 53, and the caption 54 are linked to each other and stored. The frame identifier 51 is an identifier which is allocated to each frame. A plurality of frames may be included in a single page. The page identifier 52 is an identifier of the page on which a frame data exists. The page identifier 52 corresponds to the page identifier 31 of the image data table 30. The frame region 53 indicates the region where a frame exists on the image data 8 corresponding to the page identifier 52. The caption identifier 54 is an identifier of a caption corresponding to the speech existing in a frame. The caption identifier 54 corresponds to the caption identifier 41 in the caption data table 40.

EXPLANATION OF OPERATION METHOD

Figure 7:
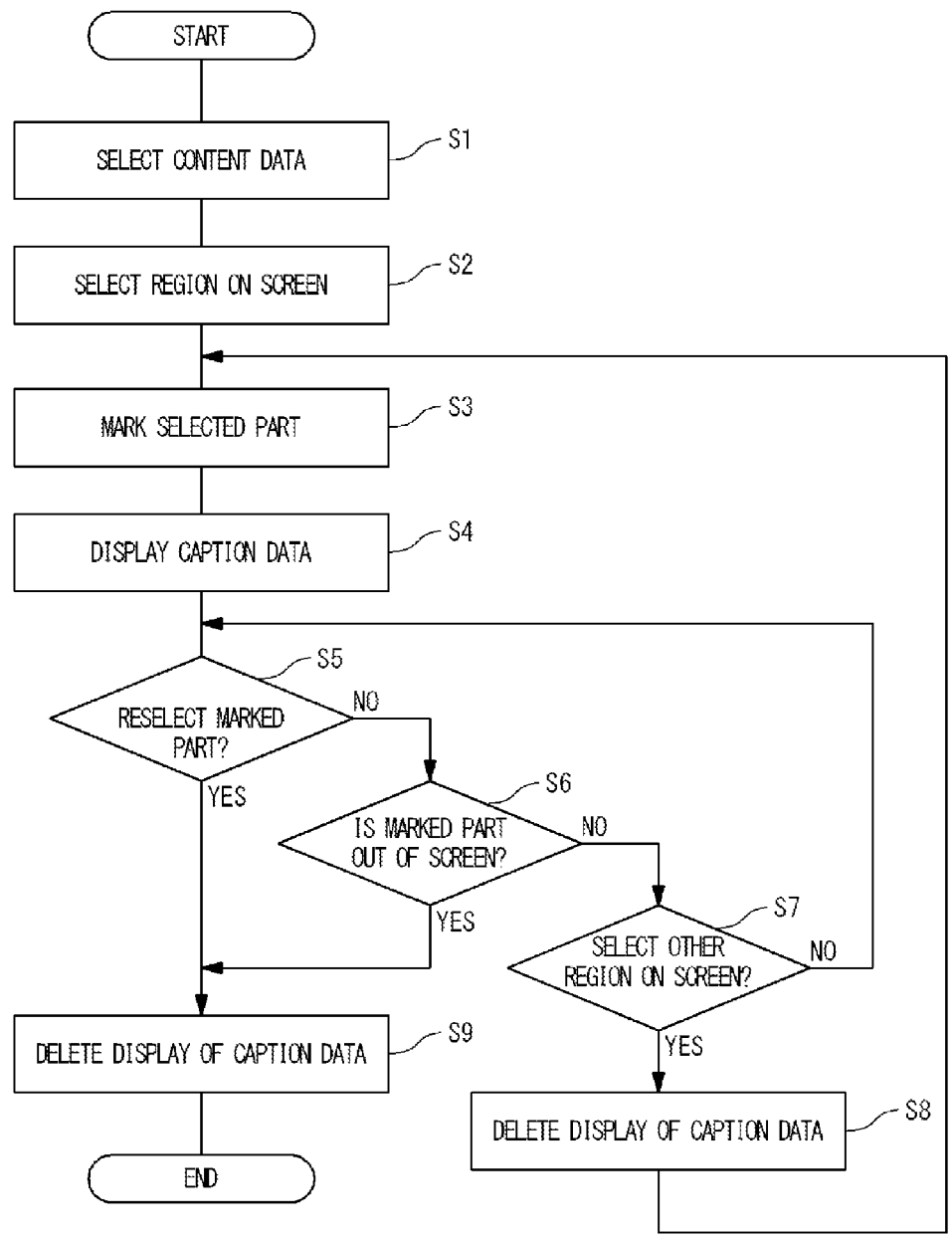
FIG. 7 is a flowchart of a method for displaying a caption data 9 on an image data 8 by the content data display device 15 according to an exemplary embodiment of the present invention.

Next, the method for displaying the caption data 9 on the image data 8 in the content data display device 15 is explained. FIG. 7 is a flowchart of the method for displaying the caption data 9 on the image data 8 in the content data display device 15.
(Step S1)
A user selects a content data 7 by performing an input operation to the input unit 2. The control unit 3 displays the image data 8 of the content data 7 being the display target on the first layer (an image display layer) of the screen of the display unit 1. In the content data display device 15 of this exemplary embodiment, the control unit 3 displays data on different layers dependently on the type of the data displayed on the display unit 1. The control unit 3 displays the image data 8 on the first layer (image display layer), and displays the caption data 9 on the second layer (caption display layer). The control unit 3 generates the image of the content data 7 displayed on the display unit 1 by overlapping the different types of data displayed on each every layer.
(Step S2)
The user selects a region on the image data 8 by the input unit 2. For example, in a case where the input unit 2 is a touch panel installed in the display unit 1, the user touches (selects) the portion where a caption is displayed on the image data being displayed on the display unit 1.
(Step S3)
The control unit 3 displays a mark on the region of the image data 8 selected at the step S2. The control unit displays the mark on the third layer (mark display layer) on the display unit 1. Since the control unit 3 displays the mark on the display unit 1, the user can recognize the selected region on the image data 8.
(Step S4)
The control unit 3 retrieves the caption data 9 corresponding to the region on the image data 8 selected at the step S2 from the caption data table 40. The control unit 3 obtains the coordinate point of the portion selected by the user via the input unit 2, determines whether or not the obtained coordinate point is included in the region of the speech region 45 of the caption data table 40, and when the included region exists, retrieves the caption data 9 corresponding to the caption data name 43 being linked to that speech region 45 from the storage unit 6. The control unit 3 displays the retrieved caption data 9 on the second layer being an upper of the first layer of the display unit 1.

The image data 8 displayed on the display unit 1 may be zoomed out by the full-screen display, or zoomed in by a zooming of specific region in the image data 8, in response to the operation to the input unit 2. In these cases, the coordinate point of the position selected on the display unit 1 and the coordinate point of the corresponding image data 8 are not uniquely coincide to each other. For example, when the screen size of the display unit 1 is (0,0) to (200,200), and the size of the image data is (0,0) to (200,200), the coordinate point of the region thereof on the image data 8 coincides. In this case, in a case where the input unit 2 is the touch panel of the display unit 1, if the coordinate position of (50,50) is tapped on the display unit 1, the coordinate position of (50,50) on the image data 8 is selected. On the other hand, when the image data 8 is zoomed in to be displayed on the display unit 1 at the magnitude of 200% in accordance with the instruction inputted to the input unit 2, and the region of (0,0) to (100, 100) of the image data 8 is displayed, if the coordinate position (50,50) is tapped on the display unit 1, the coordinate position (25,25) on the image data 8 is selected. The control unit 3 recalculates the correspondence of the coordinate point of the position on the display unit 1 selected by the operation to the input unit 2 with the coordinate point on the image data 8. The control unit 3 recognizes the changes of the display state (moving of the display portion, zooming-in, zooming-out, rotation, and the like) caused by the operation to the input unit 2 to recalculate the corresponding coordinate point on the image data 8.

Since the control unit displays the caption data 9 in response to the selection of a desired portion on the image data 8 of the content data 7, the caption data 9 of the letters on the image data 8 of the content data 7 can be displayed in a desired order, in accordance with the manner of the reference (which can be recognized for the content data display device 15 by the input operation to the input device 2) to the content data by the user.

Further, the caption data 9 is made to be corresponding to the region on the image data 8. As a result, in a case where the content data 7 is an electronic comic, it is possible to display the caption data 9 representing the letters written or drawn in the background and the like, other than on the speech balloons showing the respective utterances of characters.

Figure 8:
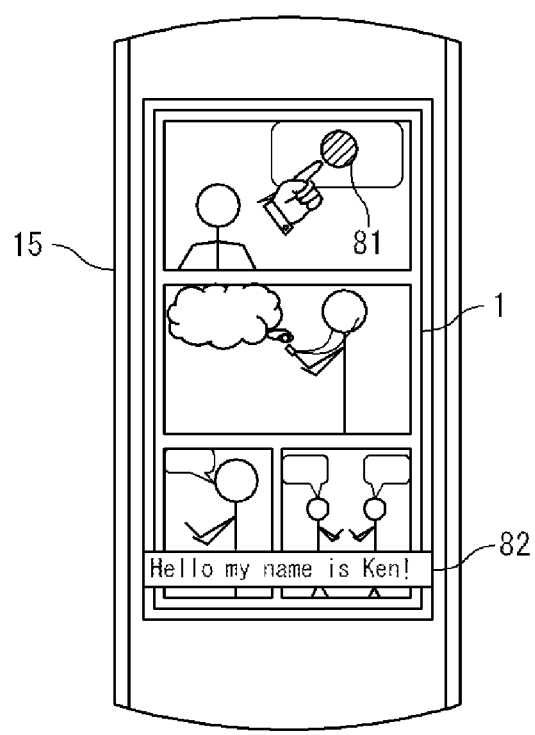
FIG. 8 is an example of displaying a caption data 9 by the content data display device 15 according to an exemplary embodiment of the present invention.

FIG. 8 is an example of the display of the caption data 9 in the content data display device 15 according to this exemplary embodiment of the present invention. The mark 81 is an example of a mark on the display unit 1 which is displayed in response to the selection of a region on the screen by the user. The caption 82 is the caption data 9 corresponding to the predetermined region which includes the mark 81 on the image data 8. The control unit 3 displays the caption 82 by overlapping it to the lower part (namely, near side to the user on the screen) of the image data 8 displayed on the display unit 1. In this case, a dedicated region for displaying the caption data 9 is not required. As a result, it is prevented for the display region of the image data 8 from being shrunk which may be caused by the display of the caption data 9. Then, the screen of the display unit 1 of the content data display device 15 is effectively used.

Figure 9:
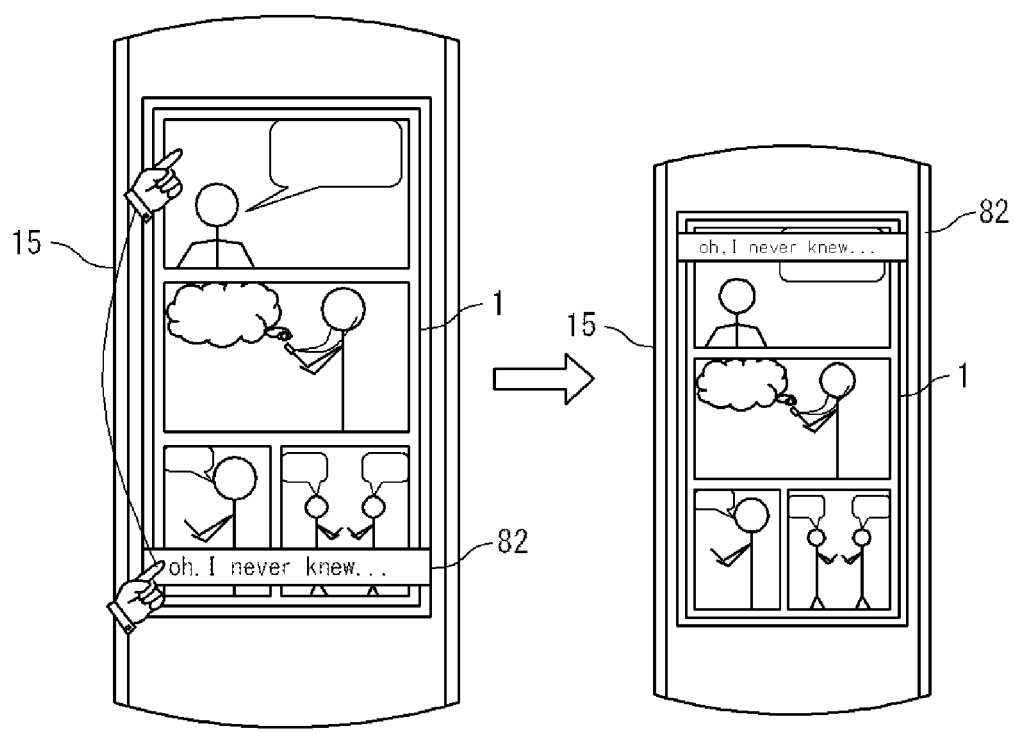
FIG. 9 is an example of a movement of the display position of the caption data 9 in the content data display device 15 according to an exemplary embodiment of the present invention.

In FIG. 8, the caption 82 is displayed on a lower part of the display unit 1. However, the default display position of the caption 82 can be appropriately set by the display position information 46 of the caption data table 40 in accordance with the region of the image data 8 corresponding to the caption 82. In the case of the caption data table 40 of FIG. 4, "lower part: 0", and "upper part: 1" are set in the display position information 46. However, any display position other than "lower part: 0", and "upper part: 1" may be set. Further, the display position of the caption 82 can be changed by the user via the input unit 2. FIG. 9 is an example of a case where the display position of the caption data 9 is moved in response to an instruction inputted to the input unit 2 by the user in the content data display device 15. For example, in a case where the input unit 2 is a touch panel using the display unit 1, when the user flicks the caption 82 to a desired display position, the control unit 3 changes the display position of the caption 82 to the direction of the detected flick.
(Step S5)
The control unit 3 checks whether or not the marked portion or the selected speech region is reselected. When the marked portion is reselected, the process proceeds to the step S9. When the marked portion is not reselected, the process proceeds to the step S6.

(Step S6)

The control unit 3 monitors whether or not the marked portion or the selected speech region is in the screen (display range) of the display unit 1 even after the operation to the input unit 2 by the user. The marked portion or the selected speech region may become out of the display range of the display unit 1 caused by the operation to the input unit 2. In such a case, the operation of the control unit 3 is exemplified as follows. When the image currently displayed on the display unit 1 is flicked or the page up/page down button is clicked by the input unit 2, the control unit 3 displays the image data specified by the page identifier of the previous or next page on the first layer in response to the flicked direction or the type of the clicked button. When the zoom-in button or zoom-out button is clicked by the input unit 2, the control unit 3 zooms in or out the image data currently displayed on the display unit 1. When an enlarged image is displayed on the display unit 1 and it is dragged on the touch panel screen or a move button (up, down, right, left) is clicked, the control unit 3 moves the position of the display range of the image data currently displayed on the display unit 1 in response to the dragged direction or the type of the clicked button.

The control unit 3 determines that the marked portion or the selected speech region is out of the screen and proceeds to the processing of the step S9, when the marked portion or the selected speech region becomes out of the display range of the display unit 1 caused by the zooming up of the image data 8 or the like, or when the marked portion or the selected speech region becomes not to be displayed caused by the change of the referenced page of the content data 7 or the like. The control unit 3 proceeds to the process of the step S7 when it is not determined to be out of the screen.

(Step S7)

The control unit 3 checks whether or not the user selects the other region of the display unit 1 by the input unit 2, and when the other region is selected, the process proceeds to the step S8, and when the other region is not selected, the process proceeds to the step S5.

(Step S8, Step S9)

The control unit 3 deletes the currently displaying caption (caption data 9) from the display unit 1.

In the step S6, the caption display is deleted caused by the zooming-in of the image data 8 and the like. However, in a case where the marked portion or the selected speech region stays in the screen of the display unit 1 even after the zooming-in of the image data 8 or the like, the control unit 3 does not delete the display of the caption data 9.

Further, the control unit 3 may zoom-in or zoom-out the image data 8 by the following method by using the frame data table 50 when displaying the caption data 9 on the display unit 1. At first, the control unit 3 reads out the caption identifier 41 corresponding to the caption data 9 on the caption data table 40 when displaying that caption data 9. Next, the control unit 3 reads out the frame region 53 of the record of the frame data table 50 which includes the read out caption identifier 41. On the use of the read out frame region 53, the control unit 3 displays the image data 8 by zooming-in or zooming-out it so that all frame region 53 is displayed in the display range of the display unit 1.

Figure 10:
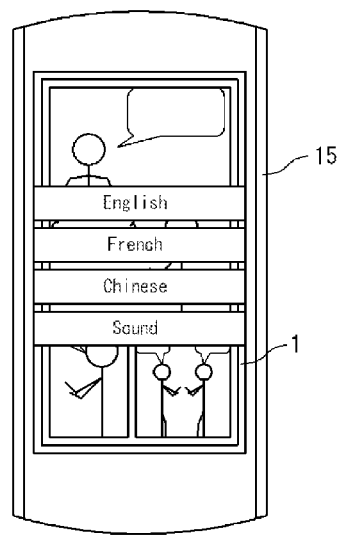
FIG. 10 is an example of a selection screen of a caption data 9 and an audio data 10 in the content data display device 15 according to an exemplary embodiment of the present invention.

In a case where a translation data to the other language is used as the caption data 9 displayed on the display unit 1, the caption data 9 corresponding to the language of each country is prepared and preliminary stored in the storage unit 6. The user can select a desired language by the input unit 2 with reference to the menu screen displayed by the content data display device 15. Further, in the configuration of the content data display device 15 according to this exemplary embodiment of the present invention, by preparing an audio data 10 corresponding to the region on the image data 8, the sound can be outputted based on the region selected by the user. FIG. 10 is an example of a selection screen of the caption data 9 and the audio data 10 in the content data display device 15 according to this exemplary embodiment of the present invention. In FIG. 10, a selection screen on which English, French, Chinese, and the audio output can be selected is shown.

A menu screen of the content data display device 15 may be designed so that a user can change the font or the character size of the caption data 9 displayed on the display unit 1 by the input operation to the input unit 2.

In displaying the caption data 9 on the display unit 1, it is preferable to display the caption data 9 such that it does not overlap with the selected speech region 45 on the display unit 1.

According to the content data display device 15 of this exemplary embodiment of the present invention, the caption data 9 corresponding to the letters on the image data 8 to which a user wants to refer can be displayed in desired order in accordance with the manner of reference to the content data 7 by the user.

Further, according to the content data display device 15 of this exemplary embodiment of the present invention, since the caption data 9 is displayed on the image data 8, the display range of the display unit 1 can be effectively used. The caption data 9 can be moved in response to the operation to the input unit 2 so that it does not prevent the reference to the image data 8.

Further, according to the content data display device 15 of this exemplary embodiment of the present invention, for example, in a case where the content data 7 is an electronic comic, the caption data 9 is not managed with the link to the speech balloon, but the caption data 9 is linked to each region on the image data 8. As a result, more flexible display of the image data 9 becomes possible, for example, the caption data 9 can be displayed for the letters out of the speech balloons.

In the above, some exemplary embodiments of the present invention are explained with reference to the accompanying drawings. However, the present invention does not limited to the above-explained exemplary embodiments, and can be modified by those skilled in the art in a range which does not deviated from the intent of the invention.

What is claimed is:

1. A content data display device comprising:
   a storage unit configured to store an image data, which includes a plurality of regions and a content data which includes a plurality of caption data that respectively correspond to the plurality of regions on the image data;
   a display unit configured to display the image data;
   an input unit configured to select a selected region from the plurality of regions; and
   a control unit configured to display a caption data among the plurality of caption data that corresponds to the selected region such that entire frame region corresponding to the caption data is displayed in a screen of the display unit by zooming-in or zooming-out the image data,
   wherein the control unit displays a menu screen having a plurality of languages from which a user selects a desired language by the input unit, and
   wherein the caption data corresponding to the selected region is displayed in the selected language such that the caption does not overlap with the selected region.

2. A content data display device according to claim 1, wherein the at least one caption data is a translated data of letters included in the image data.

3. The content data display device according to claim 1, wherein the control unit is configured to display a mark on the selected region, and delete a display of the selected caption data when the selected region on which the mark is displayed is selected by the input unit again.

4. The content data display device according to claim 1, wherein the control unit is configured to delete a display of the selected caption data when the selected region becomes not to display on the display unit.

5. The content data display device according to claim 1, wherein the control unit is configured to move the selected data displayed on the display unit to a different position on the image data based on an instruction from the input unit.

6. The content data display device according to claim 1, further comprising an audio output unit,
wherein the content data further comprises an at least one audio data respectively corresponds to the at least one region, and
the control unit is configured to control the audio output unit to output an audio data which is one of the at least one audio data and corresponds to the selected region.

7. A content data display method comprising:
storing an image data, which includes a plurality of regions and a content data which includes a plurality of caption data which respectively correspond to the plurality of regions on the image data on a storage unit;
displaying the image data by a display unit;
selecting a selected region from the plurality of regions by an input unit;
displaying a caption data among the plurality of caption data that corresponds to the selected region such that entire frame region corresponding to the caption data is displayed in a screen of the display unit by zooming-in or zooming-out the image data; and
displaying a menu screen having a plurality of languages from which a user selects a desired language, and
wherein the caption data corresponding to the selected region is displayed in the selected language such that the caption does not overlap with the selected region.

8. The content data display method according to claim 7, wherein the at least one caption data is a translated data of letters included in the image data.

9. The content data display method according to claim 7, further comprising:
displaying a mark on the selected region by the control unit; and
deleting a display of the selected caption data by the control unit when the selected region on which the mark is displayed is selected by the input unit again.

10. The content data display method according to claim 7, further comprising:
deleting a display of the selected caption data by the control unit when the selected region becomes not to display on the display unit.

11. The content data display method according to claim 7, further comprising:
moving the caption data displayed on the display unit to other position of the image data based on an instruction to the input unit.

12. The content data display method according to claim 7, wherein the content data further comprises an at least one audio data respectively corresponds to the at least one region, and
the content data display method further comprises:
controlling the audio output unit by the control unit to output an audio data which is one of the at least one audio data and corresponds to the selected region.

13. A computer-readable, non-transitory storage medium storing a program that causes a computer to perform the content data display method according to claim 7.

14. The content data display device according to claim 1, wherein the caption data is displayed at a location different from the selected region.

15. The content data display method according to claim 7, wherein the caption data is displayed at a location different from the selected region.

16. The content data display device according to claim 1, wherein when the selected region is out of the screen of the display unit during the zooming-in operation, the displayed caption data corresponding to the selected region is deleted.

17. The content data display method according to claim 7, wherein when the selected region is out of the screen of the display unit during the zooming-in operation, the displayed caption data corresponding to the selected region is deleted.

* * * * *